Figure 1:
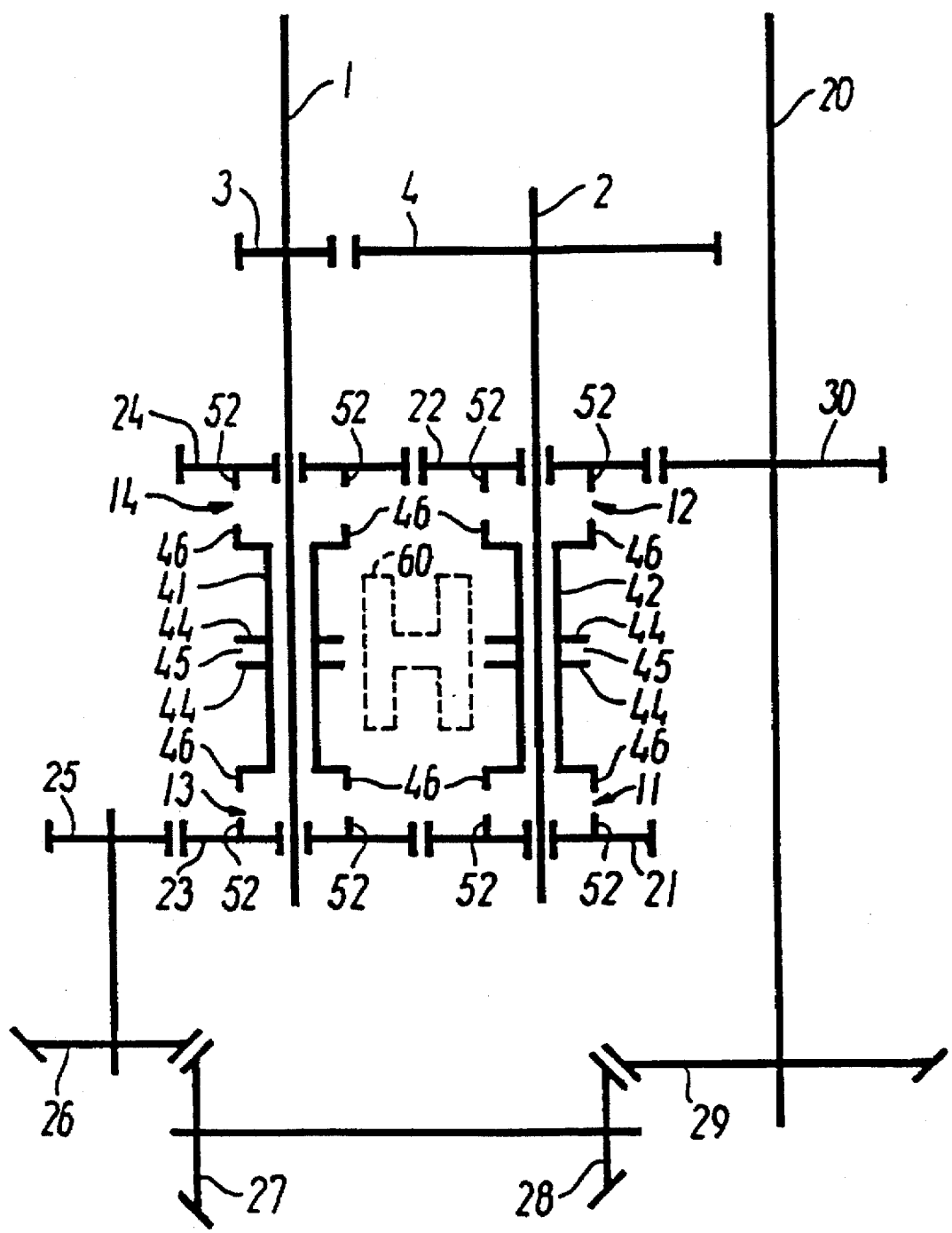

US005687610A

United States Patent [19]
Poulsen et al.

[11] Patent Number: 5,687,610
[45] Date of Patent: Nov. 18, 1997

[54] TOY GEARBOX AND A CLAW CLUTCH THEREFOR

[75] Inventors: Ole Vestergaard Poulsen; Jan Hatting, both of Vejle, Denmark

[73] Assignee: Interlego AG, Baar, Switzerland

[21] Appl. No.: 677,803

[22] Filed: Jul. 10, 1996

Related U.S. Application Data

[62] Division of Ser. No. 432,146, filed as PCT/DK94/00354, Sep. 21, 1994.

[30] Foreign Application Priority Data

Sep. 22, 1993 [DK] Denmark .................. 1071/93

[51] Int. Cl.⁶ .................. A63H 31/08; F16D 11/14
[52] U.S. Cl. .................. 74/333
[58] Field of Search .................. 74/333, 331, 325

[56] References Cited

U.S. PATENT DOCUMENTS

| | | | |
|---|---|---|---|
| 2,306,561 | 12/1942 | Peterson et al. | 74/333 |
| 2,310,310 | 2/1943 | Peterson et al. | 74/333 |
| 2,329,354 | 9/1943 | McCarter | 74/333 |
| 2,448,872 | 9/1948 | Eaton | 74/333 |
| 2,475,803 | 7/1949 | Probst | 74/333 |
| 2,543,412 | 2/1951 | Kegresse | 74/331 |
| 2,579,554 | 12/1951 | Davis | 74/333 |
| 3,475,854 | 11/1969 | Ryan et al. | |
| 4,485,587 | 12/1984 | Barlow et al. | |

FOREIGN PATENT DOCUMENTS

| | | |
|---|---|---|
| 337933 | 2/1922 | Denmark . |
| 2239082 | 2/1975 | France . |

*Primary Examiner*—Dirk Wright
*Attorney, Agent, or Firm*—Kane,Dalsimer,Sullivan,Kurucz, Levy, Eisele and Richards, LLP

[57] ABSTRACT

A toy gear box has two driven shafts which are rotationally tied to each other, and selectable gear wheel transmissions for transmitting rotational energy from driven shafts to a driving shaft, and claw clutches for selection of gear wheel transmission. Each of the driven shafts has a driving ring with guide grooves in positions opposite each other so that a gear lever can directly engage the guide grooves to axially displace the driving rings to engage claw clutches for selection of gear wheel transmission. The clutch parts of the claw clutch have claws which have a considerably smaller width than the gaps between the claws in the coupling region.

3 Claims, 3 Drawing Sheets

5,687,610

TOY GEARBOX AND A CLAW CLUTCH THEREFOR

This is a division of copending application Ser. No. 08/432,146, filed as PCT/DK94/00354, Sep. 21, 1994.

The invention concerns a toy gearbox having a driving shaft and a driven shaft and selectable gear wheel transmissions for transmitting rotational energy from the driving shaft to the driven shaft, and having axially displaceable driving means with claw clutches for selection of gear wheel transmission. The invention moreover concerns a claw clutch for such a toy gearbox, which has coaxially arranged clutch parts, each of which has axially protruding, mutually spaced claws, and which are mutually axially displaceable for releasable mutual engagement with the claws of the clutch parts.

It is required that gearboxes used in mechanical constructions such as cars and machines must have i.a. low transmission losses, i.e. the difference between the energy supplied via the driving shaft and the energy given off via the driven shaft must be as low as possible, since this energy difference is considered wasted and is lost in the gearbox where it gives rise to wear and can perhaps require separate cooling of the gearbox. A gearbox having selectable gear wheel transmissions between the driving shaft and the driven shaft is frequently used for such mechanical constructions, there being used as few gear wheels as possible for each transmission—frequently just two gear wheels per transmission. Therefore, such known gearboxes have relatively long driving and driven through shafts with each gear wheel transmission arranged in a row along the long shafts. Selection of gear wheel transmission may take place with a claw clutch for each gear wheel transmission, requiring a relatively complicated mechanism having push and pull rods for transmitting the movements of the gear lever to precisely the selected claw clutch and gear wheel transmission.

A toy gearbox as defined in claim 5 obviates the complicated mechanism, since one end of the gear lever can directly engage the guide grooves on several driving means which are arranged opposite each other. Further, a considerably shorter gearbox is obtained hereby than with the known, large mechanical structures, while providing a considerable degree of realism with simple means as regards the function of the toy gearbox and its operation.

In known claw clutches, the claws of the two clutch parts, which are intended for mutual axial engagement, are constructed such that, when engaged, they fit completely, as far as possible, into a corresponding gap between the claws of the respective other clutch part so as to provide a rotationally rigid connection. Further, the claws in the known claw clutches are flat in their coupling region, i.e. the end of the claws facing the respective other cluth part. For the clutch parts of such known claw clutches to be engaged, it is necessary that the claws of one clutch part are aligned with the gaps between the claws of the other clutch part, which, of course, is not always the case in operation, and in case of standstill it will even be impossible to interconnect the claws of the two clutch parts, if the claws on the respective clutch parts are present opposite each other.

A claw clutch as defined in claim 1 obviates these problems, and it will always be possible in practice to engage the clutch part of the claw clutch, even in case of stand-still, since, in practice, the pointed claws will always be able to find their way into the gap between the claws of the opposite clutch part owing to mechanical play in the mechanism.

Figure 2:
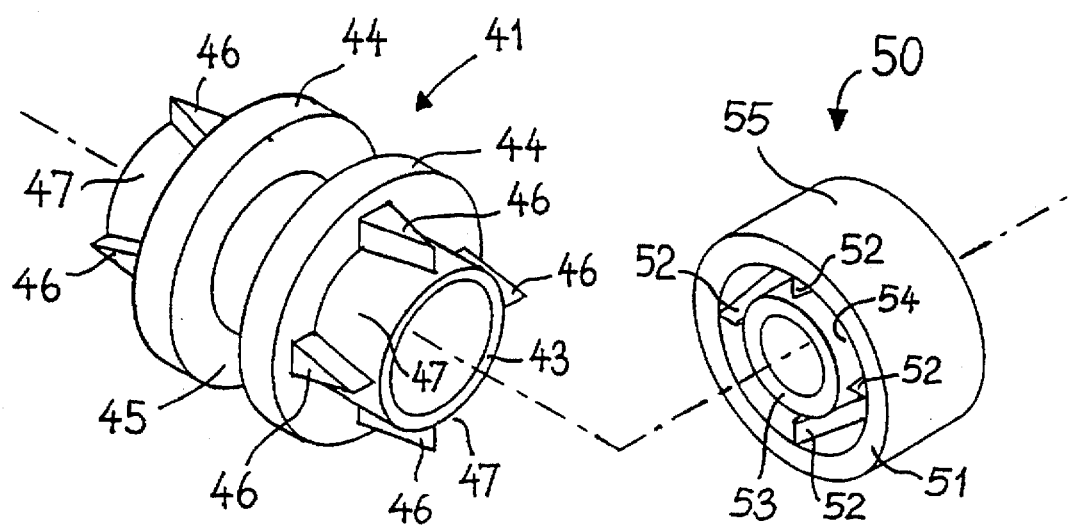

The invention will be described more fully below with reference to the drawing, in which FIG. 1 schematically shows a toy gearbox according to the invention, FIG. 2 shows a claw clutch according to the invention, and FIG. 3 perspectively shows the gearbox of FIG. 2.

Figure 3:
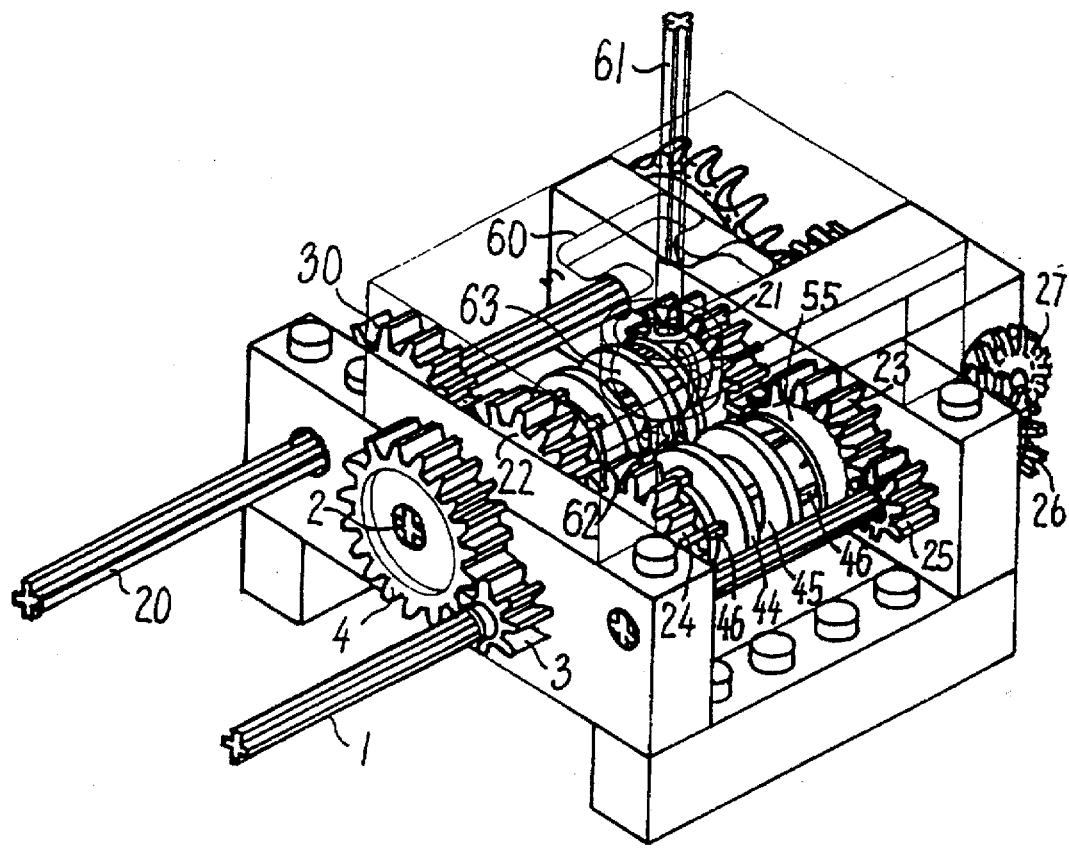

The gearbox schematically shown in FIG. 1 and also shown in FIG. 3 has an input shaft or primary driven shaft 1 with a gear wheel 3 which is fixedly mounted on the shaft. The gear wheel 3 drives a gear wheel 4 which is fixedly mounted on another shaft 2 which is parallel with the primary driven shaft 1. The gear wheels 3 and 4 are in permanent engagement, and the two shafts 1 and 2 are thus rotationally ties to each other, and owing to the different sizes of the gear wheels 3 and 4 the shafts 1 and 2 have different speeds of rotation. In this connection, these shafts 1 and 2 have the same function of driven shafts, and below the expression primary driven shaft is used for the shaft 1 and the expression secondary driven shaft for the shaft 2.

The gearbox has an output shaft or driving shaft 20 with two fixed gear wheels 29, 30. The gear wheel 29 on the driving shaft 20 is in permanent rotational connection with gear wheels 28, 27, 26, 25, 23 and 21, and the gear wheel 30 on the driving shaft 20 is in permanent rotational connection with gear wheels 22 and 24. The gear wheels 21 and 22 are mounted rotatably on the secondary driven shaft 2 in fixed axial positions, and the gear wheels 23 and 24 are likewise mounted rotatably on the primary driven shaft 1 in fixed axial positions.

The primary driven shaft 1 carries a first driving ring 41, which is rotationally tied to the shaft 1, and which can be slid axially on the shaft 1. The secondary driven shaft 2 likewise carries a second driving ring 42, which is identical with the first driving ring 41 and is rotationally tied to the shaft 2 and is axially slidable on the shaft 2.

A driving ring 41 is shown in FIG. 2 and consists of a pipe member 43 having two radially protruding flanges 44 on the outer side. The two flanges 44 define an annular guide groove 45 whose bottom is formed by a portion of the pipe member 43. Four claws 46 protrude in an axial direction from each of the flanges 44. The claws 46 are wedge-shaped and their tips face away from the flanges 44 concerned. The claws 46 are moreover in firm connection with the pipe member 43. The claws 46 are pointed and narrow, and each set of four claws defines angular gaps 47 between claws 46 which are considerably larger than the angular extent of the individual claw 46. Further, the driving ring 41 has projections (not shown) on the inner side of the pipe member 43 to engage a corresponding, axially extending depression (not shown) in each of the driven shafts 1 and 2, so that, as mentioned, the driving rings 41 and 42 are in rotationally firm connection with the respective driven shafts 1 and 2 and are axially slidable on these. On the driving ring 41, each of the flanges 44 having axially protruding claws 46 constitutes one clutch half of a claw clutch, as will be explained below.

FIG. 2 also shows the other clutch half 50 for a claw clutch. The clutch half 50 consists of an outer pipe or ring member 51 having four wedge-shaped claws 52 on the inner side, each of which has substantially the same shape as the claws 46. The clutch half 50 moreover has an inner pipe or ring member 53 which is located coaxially with the outer pipe member 51, and by means of which the coupling half 50 may be mounted freely rotatably on a shaft. The pipe members 51 and 53 are contiguous via a common flange (not shown). Each of the claws 52 and the inner tube member 53 define between them a radial gap capable of receiving the end of the pipe member 43 on the driving ring 41 so that the claws 52 may be received in the angular gaps 47 between the claws 46. Correspondingly, angular gaps 54 are present between the claws 52 in which the claws 46 may be received. The outer cylindrical surface 55 of the outer pipe member 51 may be provided with radially protruding teeth, so that the clutch half 50 serves as a gear wheel which may be mounted freely rotatably on a shaft. This is shown in FIG. 3.

The driving ring 41 and the clutch half 50 may be mounted on a common shaft on which the driving ring 41 is axially slidable, and the end of the pipe member 43 with the four claws 46 may be received in the gap between the outer pipe member 51 and the inner pipe member 53, thereby providing a claw clutch. Since both the claws 46 and the claws 52 in the coupling region are narrow and pointed and have large gaps, it will always be possible in practice to make such a coupling irrespective of the mutual angular position of the driving ring 41 and the clutch half 50.

In FIGS. 1 and 3, each of the gear wheels 21, 22, 23 and 24 are constructed like the clutch half 50 with radially protruding teeth and axially protruding claws 52. The driving rings 41 and 42 are axially slidable on the primary driven shaft 1 and the secondary driven shaft 2, respectively, so that, as described above, the claws 46 may be inserted into the angular gaps 54 between the claws 52. Thus, the gearbox has four claw clutches 11, 12, 13 and 14, which may be engaged individually. The first gear of the toy gearbox is selected with the claw clutch 11, and the transmission of rotational energy from the primary driven shaft 1 then takes place via the gear wheels 3 and 4 to the secondary driven shaft 2, which drives the second driving ring 42, from which the rotational energy is transmitted through the claw clutch 11 to the gear wheels 21, 23, 25, 26, 27, 28 and 29 to the driving shaft 20. Similarly, it will be seen that the first driving ring 41 is slidable on the primary driven shaft 1 to engage the claw clutch 14 corresponding to the fourth gear of the toy gearbox, rotational energy being transmitted from the primary driven shaft 1 and the first driving ring 41 through the claw clutch to the gear wheels 24, 22 and 30, which drive the driving shaft 20.

Similarly, it will be seen that the claw clutches 11, 12, 13 and 14 correspond to the first, the second, the third and the fourth gears of the toy gearbox, respectively.

The toy gearbox is shown in FIG. 1 in a position in which the four claw clutch gears 11, 12, 13 and 14 are all disengaged, so that no rotational movement can be transmitted from any of the driven shafts 1, 2 to the driving shaft 20, or vice versa. This means that the toy gearbox is in neutral. The two driving rings 41 and 42 here have their guide grooves 45 arranged opposite each other, and FIG. 3 shows that the gearbox has a gear lever 61 which is mounted in a ball bearing 63 centrally with respect to the shown position of the guide grooves 45 and out of the plane defined by the driven shafts 1 and 2. The gear lever can thus be tilted in the ball bearing and has its movement restricted by an H-shaped guide 60. The gear lever is movable transversely in the central part of the H-shaped guide, and an engagement end 62 of the gear lever 61 may thus be engaged with a selected one of the guide grooves 45. Upon further tilting of the gear lever in a direction longitudinally of the driven shafts 1 and 2, the gear lever moves the driving ring concerned axially because of its engagement with the guide groove 45 concerned until the claw clutched concerned is engaged. The H-shaped guide 60 ensures that no more than one of the claw clutches is engaged at a time, since movement of the engagement end 62 of the gear lever from the guide groove of one driving ring to the guide groove of the other driving ring can only take place through the central portion of the H-shaped guide 60, where both driving rings are in the shown neutral position.

With this structure, the gear lever directly engages the guide grooves of the driving rings, i.e. without intermediate mechanisms.

If desired, the gearbox may be expanded to three or optionally more parallel driven shafts equidistantly spaced from the ball bearing of the gear lever, thereby increasing the number of selectable gear wheel transmissions.

The shown toy gearbox is reciprocal so that the driving shaft 20 may be used as the driven shaft, and when the pair of gear wheels 3, 4 is omitted, the shown gearbox enables it to be chosen whether rotational energy is to be transmitted from the shaft 20 to the shaft 1 or to the shaft 2. The toy gearbox may hereby be used for driving mechanisms each of which is coupled to a respective one of the shafts 1 and 2, and these may then be driven one at a time or simultaneously.

We claim:

1. A toy gearbox comprising:

a primary driven shaft;

a driving shaft;

selectable gear wheel transmissions for transmission of rotational energy from the primary driven shaft to the driving shaft; and an axially slidable driving means with claw clutches for selection of gear wheel transmission;

wherein the primary driven shaft drives a secondary driven shaft located in parallel with the primary driven shaft, the primary and the secondary driven shafts have respective driving means with respective guide grooves in positions opposite each other, and the gearbox has a gear shift means which is a single member having a first end for direct operation by a user and a second end which is partly slidable transversely to the direction of the driven shafts to directly engage the guide groove of the driving means of only one selected driven shaft, and partly axially slidable in the direction of the driven shafts to move the selected driving means axially, thereby engaging a selected claw clutch with associated gear wheel transmission.

2. A toy gearbox according to claim 1, wherein the shift means is a lever which is mounted in a ball bearing centrally with respect to the guide grooves of the driving means and out of the plane of the driven shafts.

3. A toy gearbox according to claim 2, wherein the movements of the lever are restricted by an H-shaped guide.

* * * * *